United States Patent [19]

Yoshimura

[11] Patent Number: 4,491,965

[45] Date of Patent: Jan. 1, 1985

[54] CHARACTER RECOGNITION APPARATUS

[75] Inventor: Tooru Yoshimura, Yokohama, Japan

[73] Assignee: Tokyo Shibaura Denki Kabushiki Kaisha, Kanagawa, Japan

[21] Appl. No.: 449,688

[22] Filed: Dec. 14, 1982

[30] Foreign Application Priority Data

Dec. 16, 1981 [JP] Japan .................. 56-202808

[51] Int. Cl.³ .............................. G06K 9/03
[52] U.S. Cl. ........................ 382/57; 382/38
[58] Field of Search ............... 382/57, 37, 38

[56] References Cited

U.S. PATENT DOCUMENTS 3,764,980 10/1973 Dansac et al. ................. 382/57
3,967,241 6/1976 Kawa ........................... 382/38
4,040,009 8/1977 Kadota et al. ................. 382/38

FOREIGN PATENT DOCUMENTS 0054842 6/1982 European Pat. Off. .

Primary Examiner—Leo H. Boudreau
Assistant Examiner—Michael Murray
Attorney, Agent, or Firm—Cushman, Darby & Cushman

[57] ABSTRACT

The invention provides a character recognition apparatus having an original feature extracting section for extracting as an original feature a feature deliberately neglected in the processes of pre-process conversion and recognition feature extraction. The original feature extracted by the original feature extracting section is used for final recognition of a set of characters, thus preventing erroneous character recognition.

4 Claims, 7 Drawing Figures

|  | ANSWER FOR THE FIRST CHARACTER $a_1 = 2$ | ANSWER FOR THE SECOND CHARACTER $a_2 = 0$ | ANSWER FOR THE THIRD CHARACTER $a_3 = 0$ |
|---|---|---|---|
| | FEATURE OF THE FIRST CHARACTER $h_1 = 10$ | FEATURE OF THE SECOND CHARACTER $h_2 = 5$ | FEATURE OF THE THIRD CHARACTER $h_3 = 10$ |

11 = top row, 12 = bottom row, 6 = table

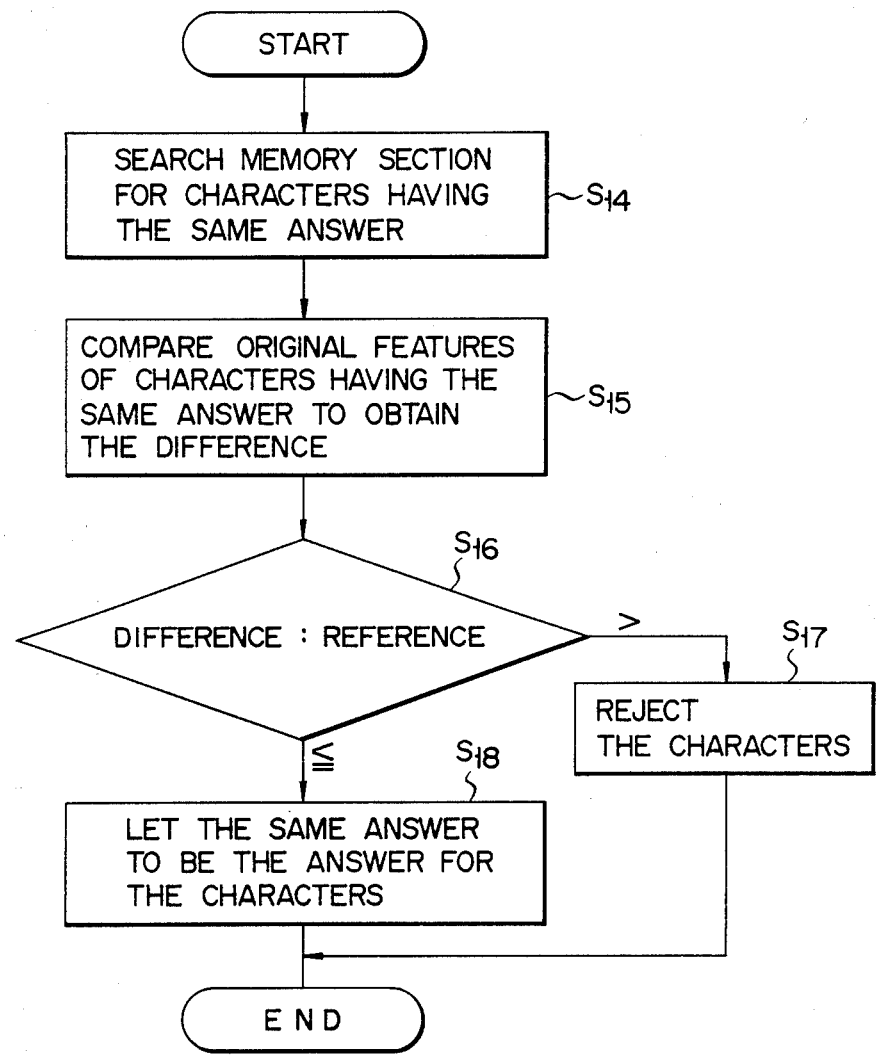

CHARACTER RECOGNITION APPARATUS

BACKGROUND OF THE INVENTION

The present invention relates to a character recognition apparatus for optically recognizing a set of characters written on a slip or the like and, more particularly, to a character recognition apparatus which provides minimal erroneous recognition.

In conventional character recognition apparatuses, each character pattern is pre-processed and converted to extract its feature (to be referred to as a recognition feature hereinafter) geographically and metrically. The recognition feature is compared with a corresponding set of features (to be referred to as a dictionary, a set of reference character pattern or a recognition table hereinafter) of a reference character of each category to obtain a corresponding answer (category name to which the character belongs).

In order to recognize a plurality of fonts of letters or characters using a minimum size dictionary, the sizes of the characters are normalized to cover variations in character size. By this normalization, partial information among the features of the character is deliberately neglected. For this reason, such normalization degrades recognition precision for variations in characters of other categories. As a result, erroneous recognition often occurs.

SUMMARY OF THE INVENTION

It is, therefore, an object of the present invention to provide a character recognition apparatus which provides minimal erroneous recognition.

It is another object of the present invention to provide a character recognition apparatus which provides minimal erroneous recognition for various feature variations in characters.

It is still another object of the present invention to provide a character recognition apparatus which provides minimal erroneous recognition, using a recognition section with a simple algorithm.

The above objects may be attained by a character recognition apparatus which comprises: segmenting means for segmenting a set of input characters into single characters; pre-process converting means connected to said segmenting means, for providing a predetermined conversion for each of the single characters so as to allow easy subsequent recognition operations; original feature extracting means connected to said segmenting means, for extracting as an original feature at least one feature among features of each of the single characters which is deliberately neglected by said pre-process converting means; recognizing means connected to said pre-process converting means, for prestoring a reference recognition feature and an answer corresponding thereto, for extracting a recognition feature from each of the single characters which is converted by said pre-process converting means, for comparing the recognition feature with the reference recognition feature, and for determining an answer for each of the single characters; memory means connected to said recognizing means and said original feature extracting means for storing the answer determined by said recognizing means and the original feature extracted by said original feature extracting means; and compiling means connected to said memory means for reading out the original features corresponding to characters which have the same value among the answers stored in said memory means after the completion of reading in said set of characters and rejecting the characters corresponding to the original features which exceed a predetermined allowable value to determine final answers for the set of characters.

According to the present invention, the feature neglected in the pre-process convertion and the recognition feature extraction is preserved in its original form. When the set of characters is recognized, final character recognition is performed using the original feature. Therefore, the character recognition apparatus is stably operated against various feature variations in characters, thus providing lower erroneous recognition. Furthermore, even if the recognition process in the recognizing section is somewhat roughly performed, the original feature is finally used to check whether or not character recognition is properly performed. Therefore, a simple algorithm can be used in the recognizing section.

BRIEF DESCRIPTION OF THE DRAWINGS

By way of example and to make the description clearer, reference is made to the accompanying drawings in which:

FIG. 7 is a flow chart for explaining operations performed by a compiling section in FIG. 1.

DETAILED DESCRIPTION OF THE PREFERRED EMBODIMENT

Figure 1:
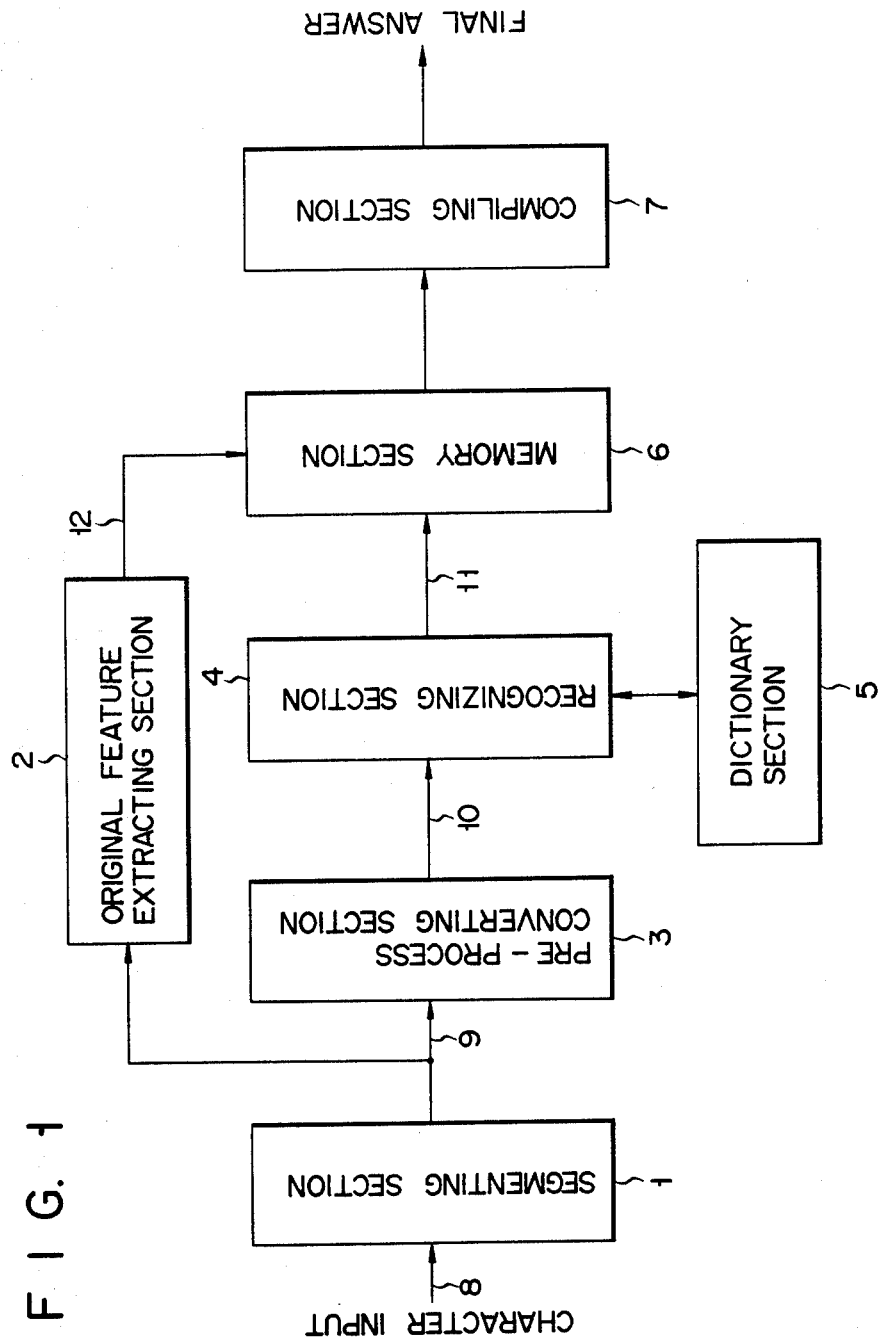
FIG. 1 is a schematic block diagram of a character recognition apparatus according to an embodiment of the present invention.

A character recognition apparatus according to an embodiment of the present invention will be described with reference to the accompanying drawings. FIG. 1 is a block diagram schematically showing the configuration of the character recognition apparatus according to an embodiment of the present invention. Referring to FIG. 1, when a set of characters read by an optical head (not shown) is supplied to a segmenting section 1, this section segments the set of characters into single characters. An original feature extracting section 2 extracts at least one original feature from among the features of the segmented character which is neglected in pre-process conversion and recognition feature extraction. A pre-process converting section 3 performs pre-process conversion such as operations for normalizing the segmented character. A recognizing section 4 extracts a recognition feature from the character which has been pre-process converted. The extracted feature is then compared with a dictionary prestored in a dictionary section 5, to produce a recognition result or answer corresponding to the extracted feature. The dictionary section 5 prestores a dictionary, that is, a set of reference character patterns for the reference characters of each category. A memory section 6 stores the original feature extracted by the original feature extracting section 2, and also the recognition result obtained by the recognizing section 4. A compiling section 7 finally determines whether or not the recognition result or answer is correct in accordance with the storage contents of the memory section 6.

Figure 2:
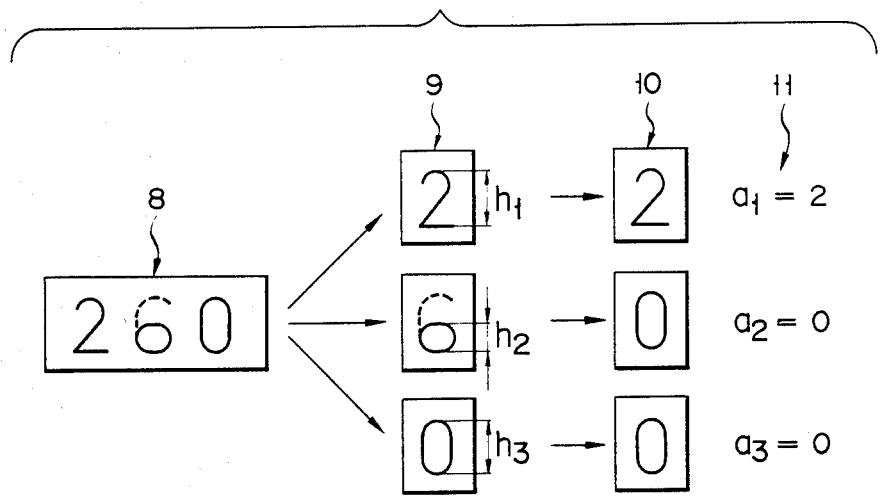
FIG. 2 is a view for explaining the mode of operation of the character recognition apparatus shown in FIG. 1.

The mode of operation of the character recognition apparatus having the arrangement described above will be described hereinafter. Assume that a set 8 (three digits) of characters shown in FIG. 2 is supplied to the segmenting section 1. The segmenting section 1 segments the set 8 of characters into single characters and produces character patterns 9 respectively corresponding to the single characters. The character patterns 9 are supplied to the original feature extracting section 2 one at a time, and each one is processed in accordance with its height, width, or the like, in steps S1, S2 and S3 of the flow chart shown in FIG. 3. It is noted that a case is described with reference to FIG. 2 in which a character height is selected as an original feature of the character pattern. The single characters have height information 12, as indicated by h1, h2 and h3, respectively. These height data 12 are stored in the memory section 6, as shown in FIG. 4.

Figure 5:
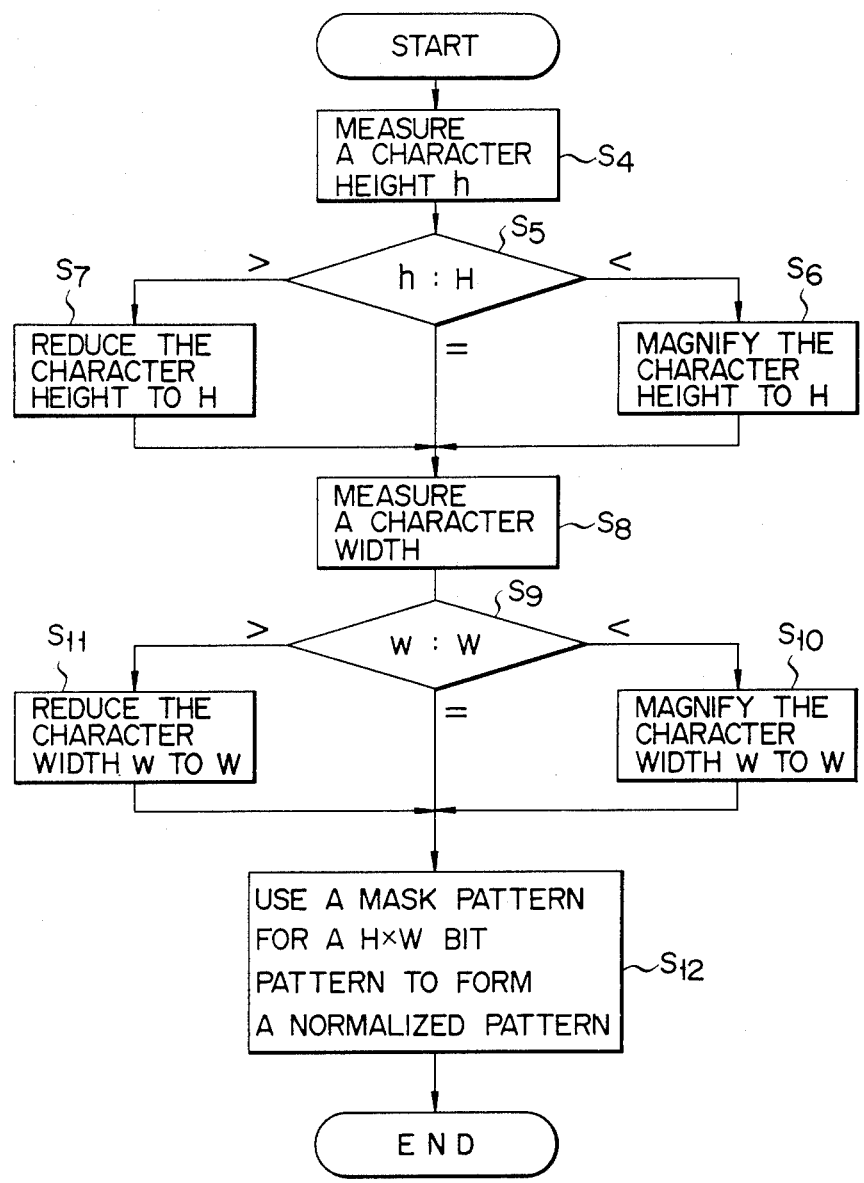
FIG. 5 is a flow chart for explaining operations performed by a pre-process converting section in FIG. 1.

The character patterns 9 are also supplied to the pre-process converting section 3 one at a time. Each character pattern 9 is processed in accordance with steps S4 to S12 of the flow chart shown in FIG. 5. Specifically, the character height is normalized in steps S4 to S7; the character width is normalized in steps S8 to S11; and normalized patterns 10 shown in FIG. 2 are produced in step S12. H of step S5 represents a predetermined height of the characters and W of step S9 a predetermined width of the characters. It is noted that character height information is lost when the character height is normalized, and that character width information is also lost when the character width is normalized. Furthermore, it is noted that information lost in the pre-process converting section 3 is pre-extracted by the original feature extracting section 2 and is stored in the memory section 6. The height and width normalization operations performed by the pre-process converting section 3 make it possible to simplify the subsequent recognition process of the recognizing section 4, and also the dictionary of the dictionary section 5.

The normalized patterns 10 obtained in the manner described above are supplied to the recognizing section 4 one at a time. Each normalized pattern 10 is processed in accordance with step S13 of the flow chart shown in FIG. 6. Specifically, the recognition feature of the normalized pattern 10 which is extracted by the recognizing section 4 is compared with the dictionary stored in the dictionary section 5. As a result, answers 11 are obtained which correspond to the normalized patterns 10 and comprise a1, a2 and a3, respectively. When the upper portion of the second character "6" of the set 8 of input characters is blurred as shown in FIG. 2, the pattern obtained by normalization is represented by "0". Therefore, the recognizing section 4 determines the answer to be a2=0. The answers a1=2, a2=0 and a3=0 are stored in the memory section 6 in a manner shown in FIG. 4.

According to the present invention, in order to eliminate such an erroneous recognition, the compiling section 7 is arranged to finally determine, after the set of characters are recognized, whether or not the answers for the set of characters are correct. The compiling section 7 performs the final determination based on the data stored in the memory section 6 shown in FIG. 4, in accordance with the flow chart shown in FIG. 7. Specifically, identical or the same answers are searched for among the answers 11, corresponding to the respective characters, whose data are stored in the memory section 6 (step S14). The original features resulting in the identical answers are then compared, and a difference therebetween is obtained (step S15). The difference is compared with the preset reference value (step S16). If a difference is greater than the reference value, the characters which give rise to the difference are rejected (step S17). However, if all such differences are smaller than the reference value, all the answers whose data are stored in the memory section 6 are regarded as correct answers for the set of characters.

Figure 3:
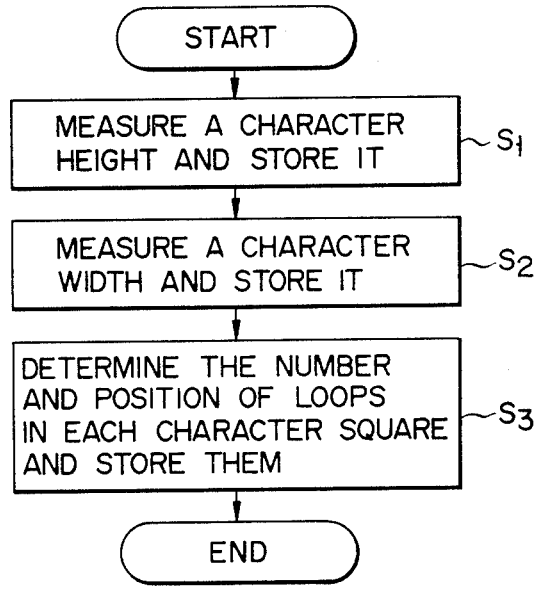
FIG. 3 is a flow chart for explaining operations performed by an original feature extracting section in FIG. 1.
Figures 4, 6:
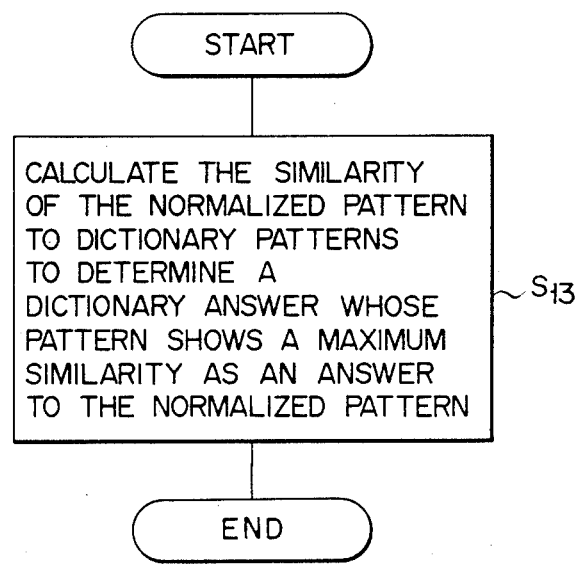
FIG. 4 is a view showing the location of data stored in the memory section in FIG. 1.
FIG. 6 is a flow chart for explaining operations performed by a recognizing section in FIG. 1.

In the example shown in FIGS. 2 and 3, answers a2 and a3 which respectively correspond to the second and third characters are both "0". However, a difference between the original features h2 and h3 is 5, so that these characters can be rejected when the reference value is set as 3. As a result, even if the upper portion of the second character "6" is blurred, it will not be erroneously recognized as "0". The degree of prevention of erroneous recognition increases as the number of characters increases.

The present invention is not limited to the particular embodiment described above. In the above embodiment, the case is described in which two characters among a set of characters are the same. However, when the number of characters is large and when more than three identical answers are present, the principle of majority is used to reject only characters which may be erroneously recognized.

In the above embodiment, after the size of the character is normalized in the pre-process converting section, answers are determined by the recognizing section. For this reason, character height information is adopted as the original feature. However, the original feature is not limited to this. Deliberately neglected information can be generally selected as the original feature in order to provide highly precise character recognition against variations in character features for various character recognition algorithms, or in order to simplify the recognition algorithm. Therefore, any other information can be used as the original feature to obtain the same effect as obtained in the above embodiment.

Other changes and modifications may be made within the spirit and scope of the present invention.

What is claimed is:

1. A character recognition apparatus comprising:
    segmenting means for segmenting a set of input characters into single characters; pre-process converting means connected to said segmenting means, for providing a predetermined conversion for each of the single characters so as to allow easy subsequent recognition operations;
    original feature extracting means connected to said segmenting means, for extracting as an original feature at least one feature among features of each of the single characters which is deliberately neglected by said pre-process converting means;
    recognizing means connected to said pre-process converting means, for prestoring a reference recognition feature and an answer corresponding thereto, for extracting a recognition feature from each of the single characters which is converted by said pre-process converting means, for comparing the recognition feature with the reference recognition feature, and for determining an answer for each of the single characters;

memory means connected to said recognizing means and said original feature extracting means for storing for each of the single characters the answer determined by said recognizing means and the corresponding original feature extracted by said original feature extracting means; and compiling means connected to said memory means for reading out the original features corresponding to characters which have the same value among the answers stored in said memory means after the storing of answers and corresponding original features for each of said characters and for rejecting the characters corresponding to the original features which exceed a predetermined allowable value to determine final answers for the set of characters.

2. An apparatus according to claim 1, wherein said compiling means compares a predetermined reference feature with each of the original features of the characters corresponding to the identical answers obtained by said recognizing means to detect a difference therebetween and rejects the characters corresponding to a difference which exceeds the predetermined allowable value, thereby determining the final answers for the set of characters.

3. An apparatus according to claim 1, wherein said predetermined conversion performed by said pre-process converting means is a conversion of normalizing a size of each of the characters.

4. An apparatus according to claim 2, wherein said predetermined reference feature used in said compiling means is one of the original features corresponding to the identical answers.

* * * * *